June 21, 1932. W. V. LOZIER 1,864,450
MACHINE FOR MANIPULATING BOLT BLANKS
Filed Dec. 3, 1928 5 Sheets-Sheet 1
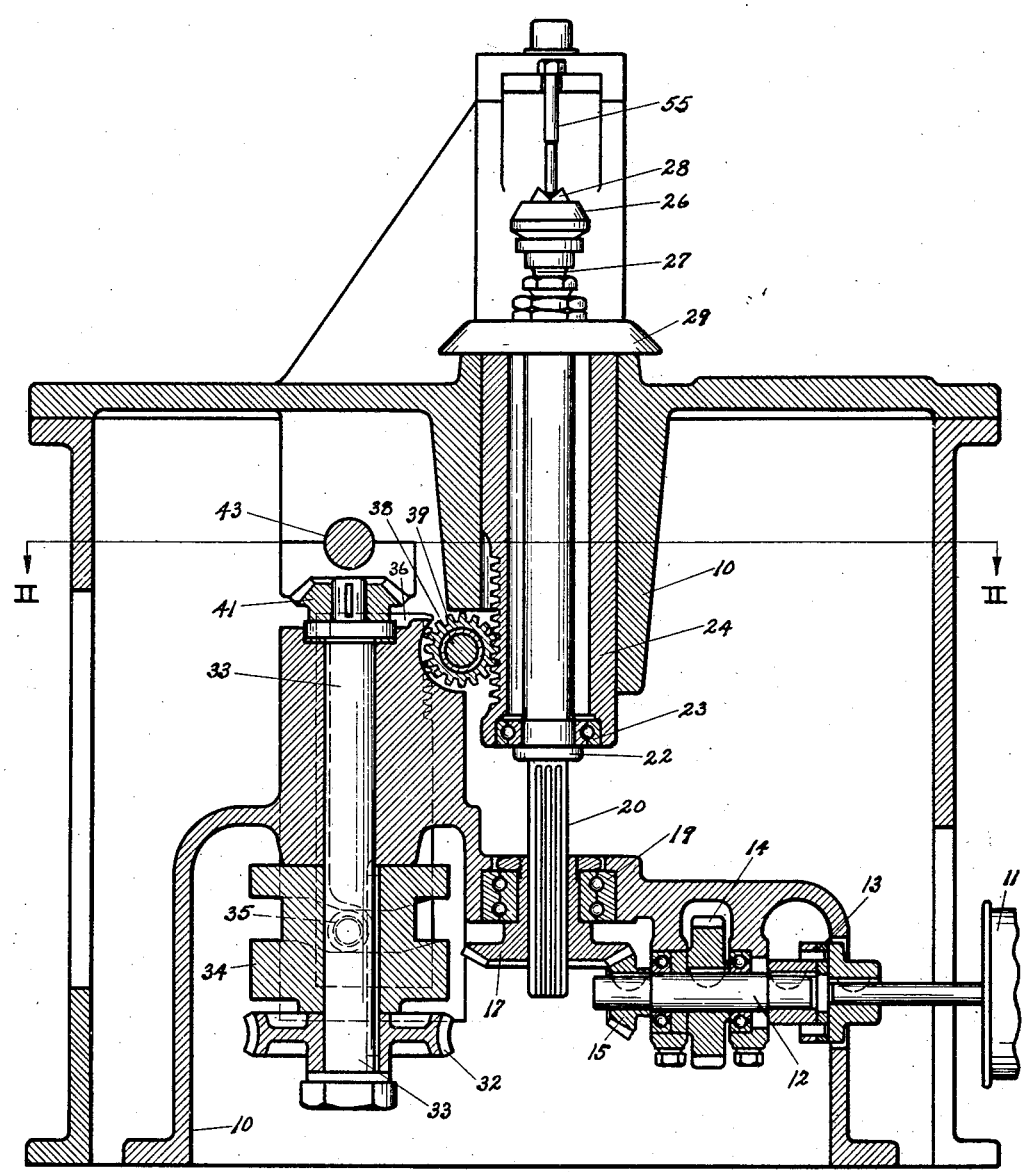
Fig. I.
INVENTOR.
WILLIAM V. LOZIER
BY
Warren T. Hunt
ATTORNEY.

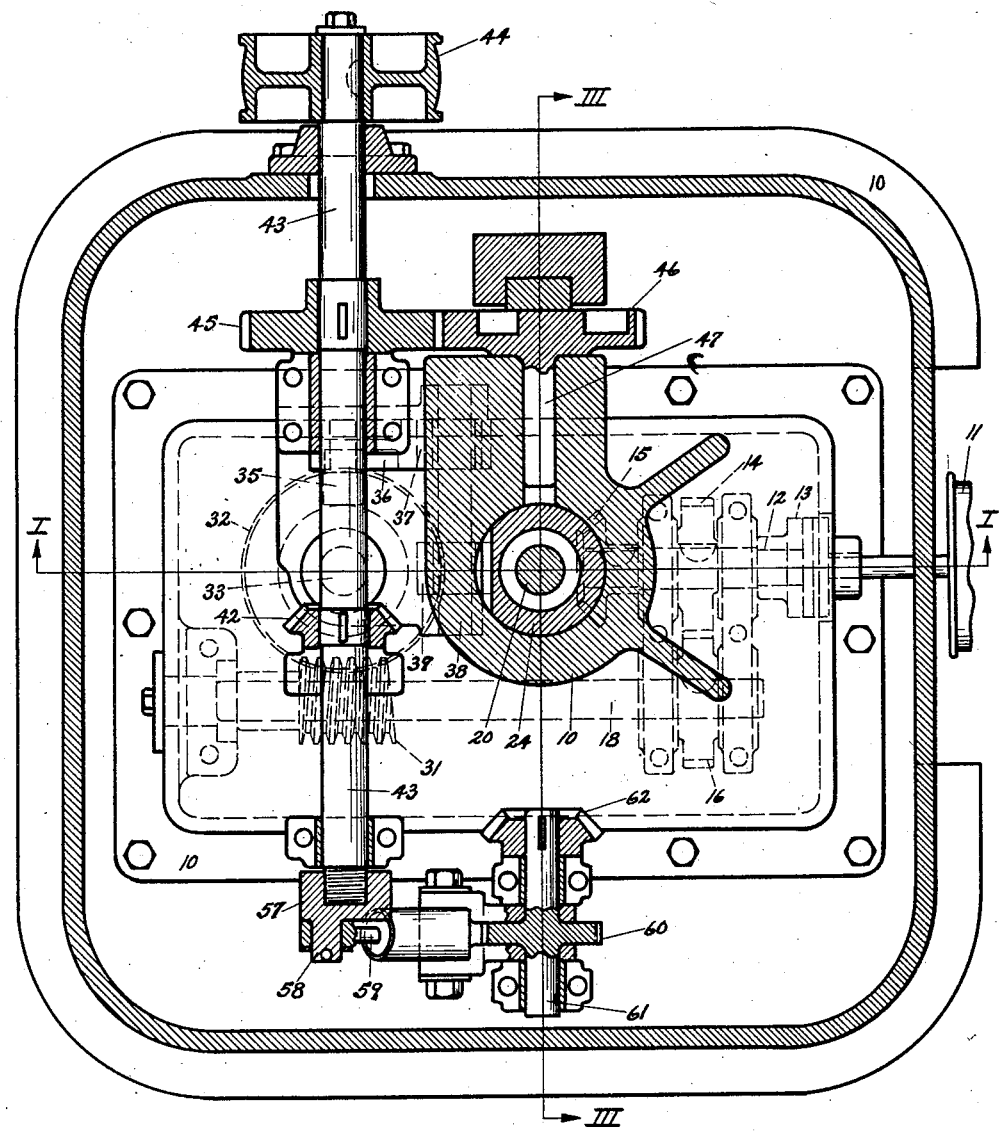
Fig. II.
INVENTOR.
WILLIAM V. LOZIER
BY
Warren T. Hunt
ATTORNEY.

June 21, 1932. W. V. LOZIER 1,864,450
MACHINE FOR MANIPULATING BOLT BLANKS
Filed Dec. 3, 1928 5 Sheets-Sheet 3
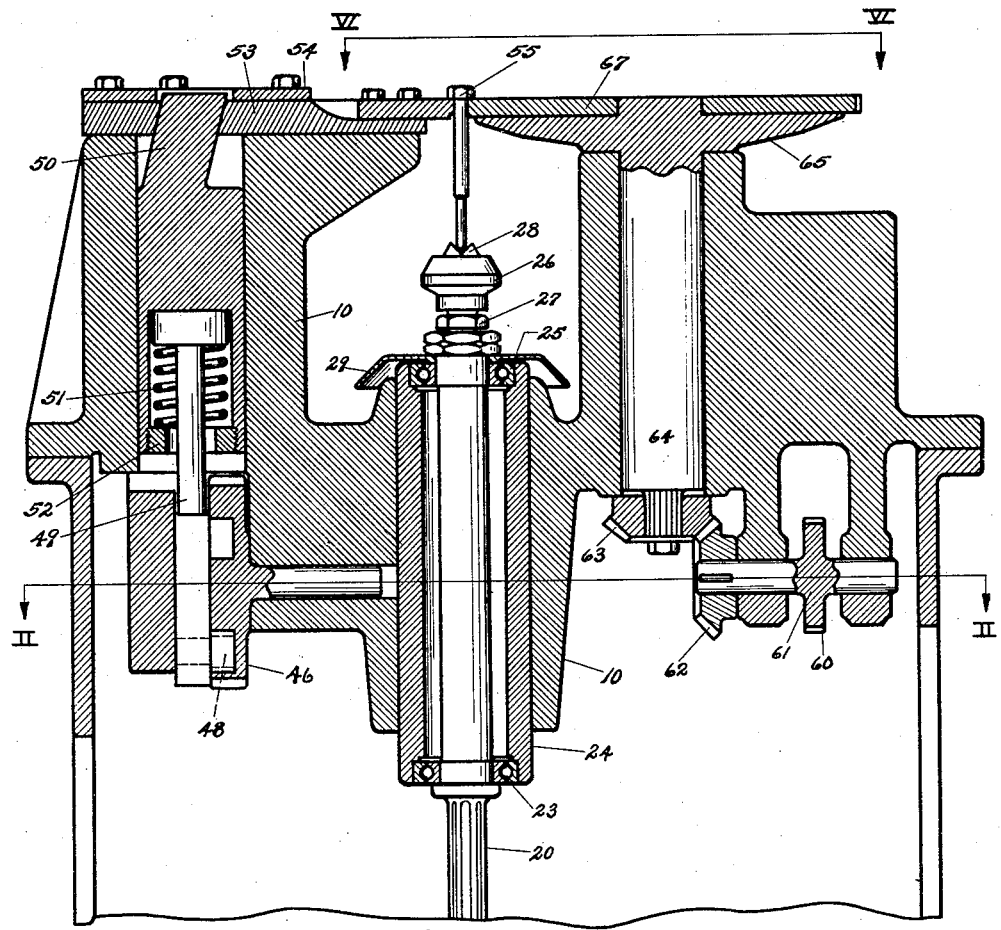
Fig. III
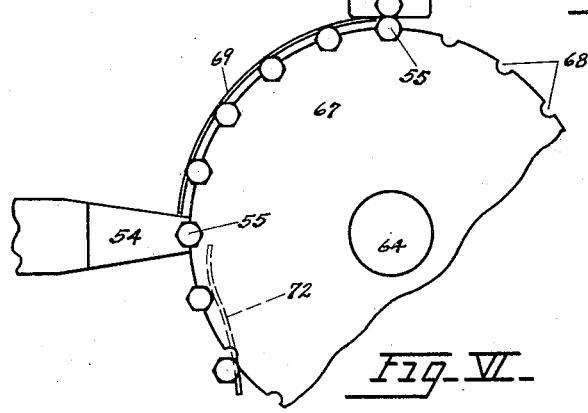
Fig. V
INVENTOR.
WILLIAM V. LOZIER
BY
Warren P. Hunt
ATTORNEY.

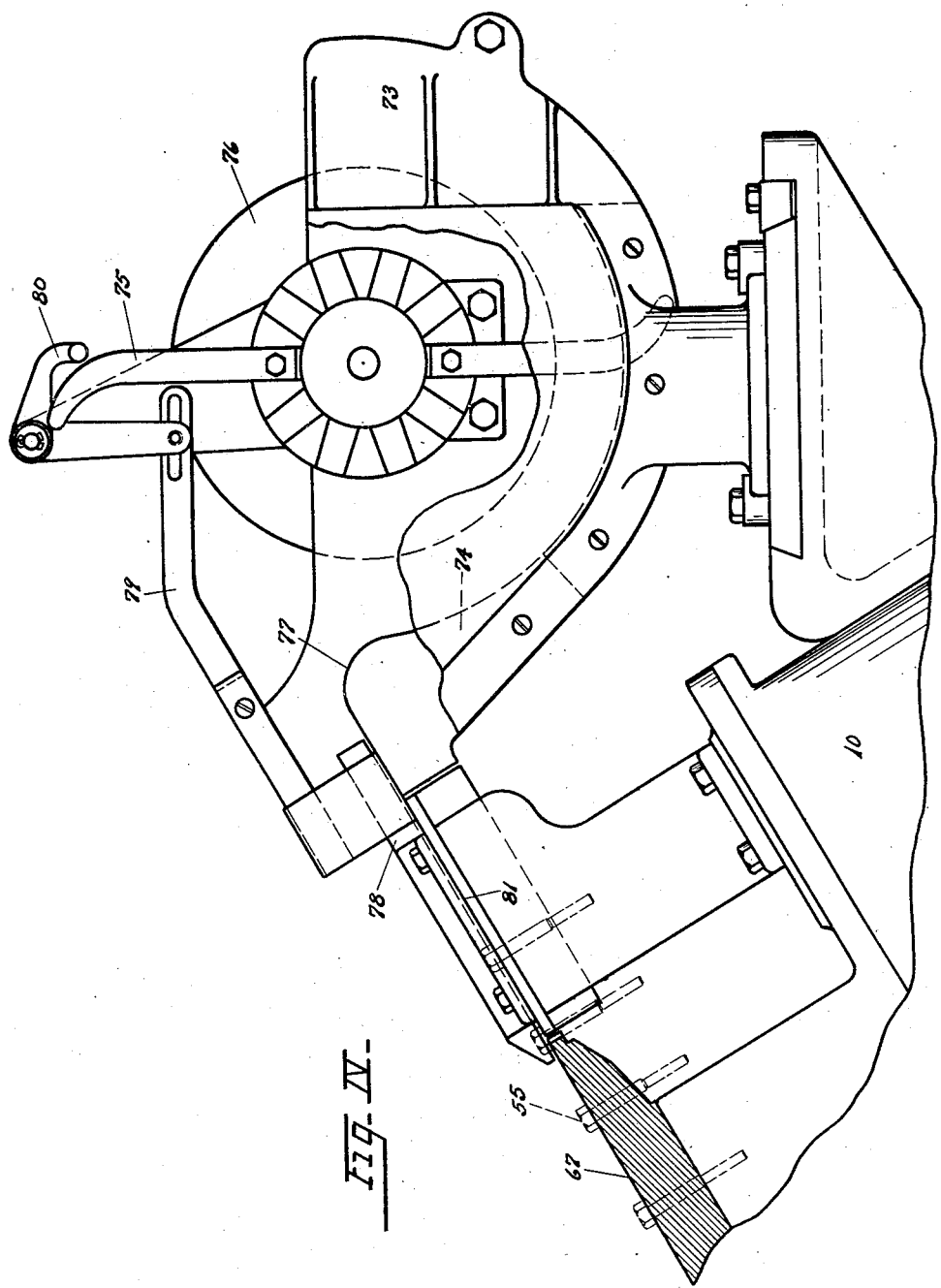

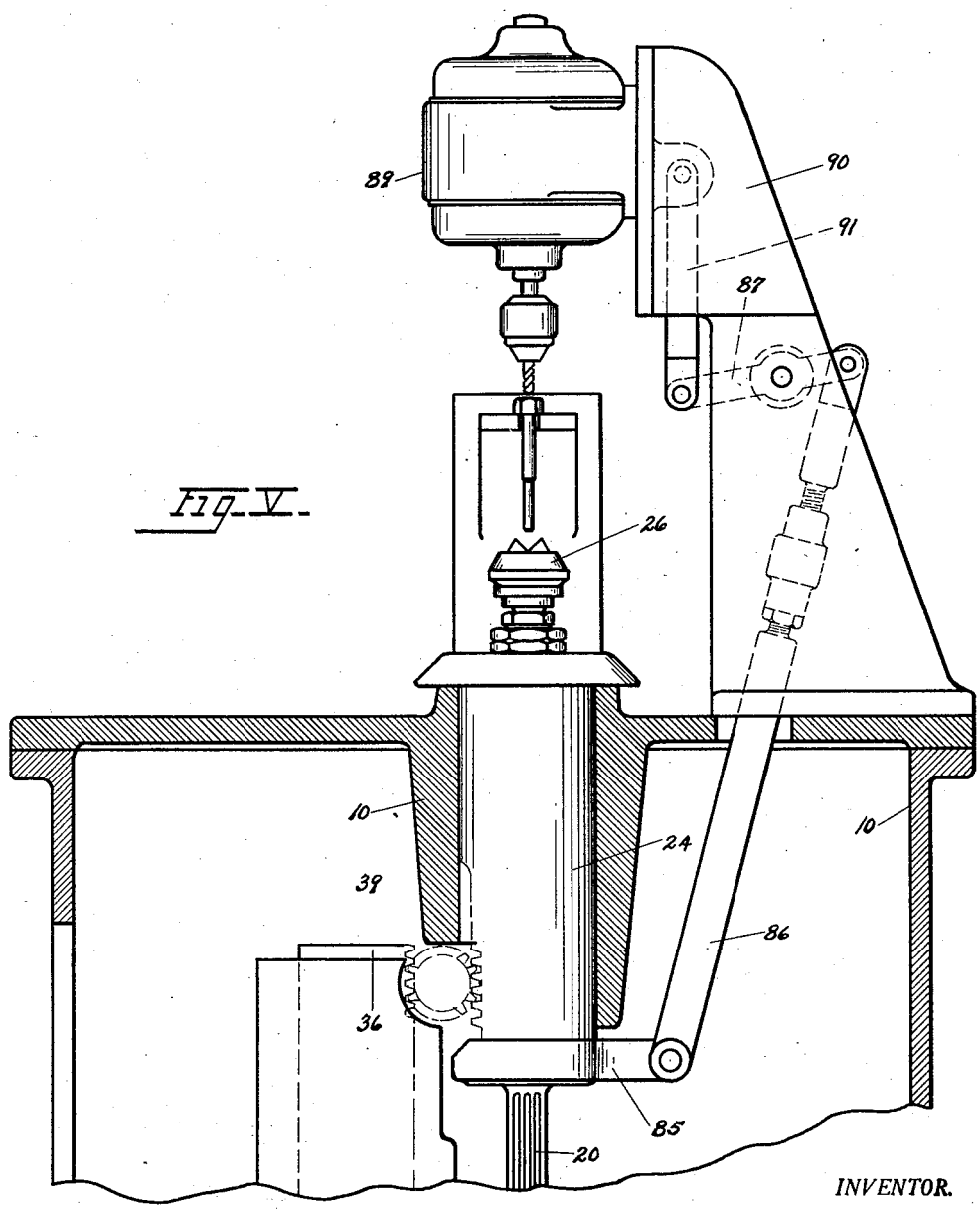

Patented June 21, 1932

1,864,450

UNITED STATES PATENT OFFICE

WILLIAM V. LOZIER, OF ELMIRA, NEW YORK, ASSIGNOR TO THE WILLYS-OVERLAND COMPANY, OF TOLEDO, OHIO, A CORPORATION OF OHIO

MACHINE FOR MANIPULATING BOLT BLANKS

Application filed December 3, 1928. Serial No. 323,352.

This invention relates to automatic screw and bolt machines and it has particular relation to machines of the above designated class, which may be employed to point, or perform other operations on bolt or screw blanks.

One object of the invention is to supplant the present day practice, by which bolts are pointed or otherwise operated upon manually.

It is a further object of the invention to provide an automatic machine which is adapted to receive the unfinished bolt, dispose each bolt in a pre-determined fixed position and perform the required bolt-finishing operations thereon.

The invention likewise contemplates the provision of a machine by which the end of the bolt may be pointed while the head of the bolt is drilled radially, or axially, without manual aid.

It is a further object of the invention to provide a machine having an improved means for supporting bolt shanks singly, whereby any desired operations may be performed thereon.

These, together with other objects of my invention, will be more clearly understood by referring to the drawings and description specifically related thereto which are hereinafter set forth.

Figure I is an elevational view, partly in section, of an embodiment of my invention which may be preferred and which is taken substantially along the line I—I in Fig. II.

Fig. II is a plan view, partly in section, of the entire machine, section being taken along the lines II—II in Figs. I and III.

Fig. III is a sectional view, in elevation, taken along the line III—III in Fig. II.

Fig. IV is an elevational view illustrating the relationship which the feeding mechanism bears to the structure of my invention.

Fig. V is an elevational view, partly in section, illustrating the relationship which the means for performing an operation on the bolt bear to the bolt, the means illustrated being a pointing mechanism for the end of the bolt and the drilling mechanism for the head thereof; and Fig. VI is a plan view of a portion of the grooved disc and elements co-operative therewith.

In practicing my invention and referring particularly to Figures I and II, I provide a stationary frame structure 10 having suitable bearings and journals where needed to support the shafts and other mechanical elements that are combined to realize the objects of the invention.

The power is supplied to the structure by means of a belt driven pulley 11 that drives a horizontal stub shaft 12 through a suitable coupling 13. A spur gear 14 and bevel gear 15 are keyed to the stub shaft and drive mating spur and bevel gears 16 and 17 respectively. The mating spur gear 16 is keyed to a horizontal shaft 18 disposed adjacent the stub shaft 12 whereas the mating bevel gear 17 is adjustably supported within a roller bearing 19 and provided with a bore that is machined to mesh with the splined end of a vertically movable tool shaft 20.

A collar 22, formed integrally with the shaft, engages the inner race of a bearing 23, the outer race of which is disposed securely within the quill 24 that is vertically slidable in the frame member 10. Near the upper extremity of the tool shaft a co-acting bearing 25 is adjustably secured. A tool holder 26 is mounted on a threaded shank 27, which is screwed into the end of the shaft. The tool may consist of inclined cutting surfaces 28 adapted to point, or chamfer, the end of the bolt, substantially as shown or for performing other desired operations. A guard 29 is fixed to the vertical shaft and protects the bearing 25 from the metallic chips incidental to the pointing operation.

To one end of the shaft 18, opposite to that to which the gear 16 is keyed, a spiral pinion 31 is secured, which drives a worm gear 32 that is keyed to a vertical stub shaft 33, rotatably mounted in the frame member. Adjacent this gear, a cam collar 34 is keyed to the shaft, which is formed with a circumferential cam channel. The cam is adapted to receive a follower 35, which rides within the channel and undergoes an intermittent vertical movement. The follower is secured to a vertical rack member 36 which is slidably disposed in the frame, the rack portion of which meshes with a pinion 37. A short stub shaft 38, perpendicularly disposed with respect to the vertical shaft and journalled in the frame 10, supports the pinion 37 which is keyed thereto as well as a second pinion 39 which is likewise keyed to the shaft. The second pinion meshes with the ratchet portion of the quill and imparts a vertical oscillatory movement thereto that is synchronized with that imparted to the follower 35 by the cam member 34.

To the upper extremity of the vertical stub shaft 33 there is keyed a bevel gear 41 which meshes with a mating bevel gear 42. The mating gear is keyed to a horizontal shaft 43 that traverses the machine and is journalled at both ends in the frame thereof. A pulley 44 is keyed to one end of the shaft which operates the feeding mechanism (to be described later) through a belt (not shown). Adjacent the pulley, a spur gear 45 is keyed to the shaft, which rotates a mating spur gear 46 having a channel formed on its outer face that is eccentric with respect to the axis of the gear and functions as a cam, in a manner to be described. The channel-faced gear is mounted on a short shaft 47, which is rotatably supported at one end in the frame 10. A follower 48 rides the walls of the channel and is secured to a vertical pin 49 having a head portion at its upper extremity. The head is freely disposed within the hollowed end of a cam-faced plunger 50, that is itself slidable between walls of the frame. A spring 51 is coiled about the pin and is disposed between the head thereof and a threaded washer 52 which is screwed into the hollowed end of the plunger. The sides of the upper extremity of the plunger are inclined at an angle to the vertical and serve to actuate horizontally a jaw 53 which is itself slidably disposed between the frame and a cover plate 54 that is bolted to the frame. The benefit of the spring is had when the clamping jaw is moved into engagement with the bolt 55, since to engage the bolt, the pin 49 is actuated downwardly compressing the spring and transmitting the force therethrough to the plunger, which in turn causes the jaw to slide into engagement with the bolt. The jaw is, therefore, actuated through a spring member and is to that extent resiliently disposed with respect to the frame.

A cap 57 is rigidly secured to the opposite extremity of the transverse shaft 43 and is provided with an eccentric lug 58. One end of a pitman rod 59 is rotatably secured to the lug, the other end, being suitably guided, functions as a pawl and actuates a ratchet wheel 60. The ratchet wheel is integral with the rotatable shaft 61, to which a bevel gear 62 is keyed. A mating bevel gear 63 is formed with a splined bore which meshes with the splined end of a vertical arbor 64. The arbor is journalled in the frame member, and is provided with a shoulder 65 at its upper extremity, which rests upon the frame member. A disc 67 is secured to the upper face of the arbor, which is provided with a plurality of recesses 68 on its periphery, wherein bolt shanks may be disposed. A retaining bar 69, which is spaced from the circumference of the disc functions to maintain the bolt within the notches thru approximately a quarter of the revolution. It extends between the feeding mechanism 70 herein to be described, and the engaging jaw 53. A guard member 72 is supported beneath the disc and functions to free the bolt of the disc, after it is released by the clamping jaw 53. Under certain conditions, the bolt blank may exhibit a tendency to adhere within the notch of the disc, after the jaw is released. The guard member 72 in co-operation with the rotatable disc, acts to disengage the bolts from the disc which drop into a suitable receptacle below.

In Figure IV there is illustrated a mechanism for supplying bolts to the disc in a predisposed position. It consists of a receptacle 73 wherein the upset bolt blanks are supplied. Parallel arcuate members 74 at the base of the receptacle are spaced a distance less than the diameter of the bolt head and more than the diameter of the bolt shank. A plurality of arms 75 having curved tips are rotatably mounted and slowly driven from a pulley member 76. The movement of the arms thru the container produces a continuous re-arrangement of the bolts. Each arm elevates these bolts whose shanks have fallen between the spaced members, carrying them upwardly to the top of the spaced members indicated by numeral 77. From this position the blanks slide downwardly, suspended from the inclined members 81 by their heads. The downward movement is aided by a reciprocating member 78, which engages the bolts and is actuated from a bar 79 through a bell-crank 80 above the bolt blank container. The bolt blanks are supplied to the disc 67, which is co-operatively disposed with respect to the end of the spaced inclined members, whereby a bolt blank drops into each peripheral groove 68, as it passes the discharge end of the spaced members 81. The disc 67 is disposed sufficiently close to prevent the bolts from being discharged from the supporting members during the interval that the plain portion of the disc 67 is opposite the discharge end of said supporting members 81.

If it is desired, the bolt may not only be pointed but other operations may be performed thereon, while it is clamped between the jaw 53 and the disc 67. In Figure V, there is illustrated a mechanism for drilling a hole in the head of the bolt, as is common practice for some purposes. To this end, a collar 85 is fixed securely to the lower extremity of the reciprocable quill 24.

A vertically inclined adjustable rod 86 is pivotally secured to the collar at its lower end, and similarly secured to a link 87 which is adapted to be oscillated on an axis intermediate its extremities. The oscillatory movement, so imparted to the link, is transmitted to a motor driven drill 89, which is slidable vertically on a bracket 90 and actuated directly by the link 91. By means of this arrangement, the drill 89 is brought into engagement with the head of the bolt simultaneously with the upward movement of the quill, whereby the pointing operation is performed.

The operation of the device may be more clearly understood by following through a single cycle. The power is, of course, furnished to the pulley 11 continuously. The stub shaft 12, which is driven by the pulley, rotates the vertical tool shaft continuously, through the mating bevel gears. The spur gear 14, which is keyed to the stub shaft, rotates the horizontal shaft 18, which, in turn, rotates the vertical shaft 33 continuously through the worm 32 and pinion 31. Vertical reciprocatory movement is imparted to the tool shaft 20 and quill 24 by means of the channelled collar 34 and follower 35, which reciprocate the rack member 36 and impart a reciprocatory movement to the quill through the pinions, which are keyed to the horizontal shaft 38. The reciprocatory movement, so imparted, to the quill and tool shaft is synchronized with a horizontal transverse shaft 43, which is driven from the vertical shaft 33 through the bevel gears 41 and 42. Intermittent rotary movement of the disc is obtained by means of a pitman rod 59 which actuates the ratchet wheel 60. The ratchet wheel, in turn, drives the bevel gears 62 and 63 through the stub shaft 64.

Movement of the clamping jaw 54 is realized by means of an eccentric channel faced gear 46, which is driven by the gear 45 that is keyed to the transverse shaft 43. The follower 48 within the channel, reciprocates the cam member 50 vertically through the coil spring 51 which, in turn actuates the clamping jaw horizontally.

The grooved disc 67 is so disposed, with respect to the inclined members 81, as to receive a bolt each time the disc is moved forward. When the disc stops momentarily the clamping jaw 54 engages the bolt shank and clamps it firmly against the disc, after which the pointing tool 26 is actuated upwardly into engagement with the end of the bolt and the drill 89 is lowered into engagement with the head thereof. These operations having been performed, the quill is actuated downwardly, thereby lowering the pointing tool, and raising the drill, after which the clamping jaw is released and the disc is rotated through the necessary angle to bring the next succeeding bolt into operative relation with respect to the clamping jaw and permitting the next bolt blank to drop into the groove from the inclined feeding member.

It is to be understood, of course, that parts other than bolt blanks may be machined on a device of my design and that the term "bolt" as employed in the specification and claims, is to be construed to include screws, bolts, pins and similar parts.

It is likewise to be noted that although I have illustrated a pointing mechanism and drilling mechanism, which operate on the blank after it is clamped, other mechanisms may be substituted to operate thereon without departing from this concept. In the drawings, there is illustrated a bolt supplying mechanism which arranges the bolts in a predisposed position. Obviously, the precise means for arranging the bolts, forms a part of the invention, only in so far as to afford a source of pre-disposed bolt blanks. Other feeding mechanisms may be substituted to perform this operation, or to supply elements upon which to operate, which do not suit themselves to this precise bolt-supplying device.

Although I have illustrated and described but a single embodiment of my invention, it is apparent to those skilled in the art, that many modifications may be introduced without departing from the spirit, or scope, of the principles underlying my invention, and I desire, therefore, that it be limited only as indicated in the appended claims.

I claim:

1. A machine of the class described comprising means for receiving a bolt blank, means for engaging the blank below the head thereof and thereby clamping the same in fixed position, rotatable means for pointing the end of the bolt while so clamped, and means adapted to be actuated simultaneously with the pointing means for performing the drilling operation on the head of the bolt.

2. In a machine of the class described, comprising means for supplying predisposed headed bolt blanks, intermittently actuated means for receiving the bolt blanks singly, means including a resiliently actuated member movable toward the receiving means for engaging and clamping the bolt blank firmly between said receiving means and said member while said receiving means is stationary, and means for simultaneously pointing the end of the bolt and performing a drilling operation on the head thereof while said bolt is in clamped position.

3. A machine of the class described comprising means for supplying predisposed bolt blanks, a rotatable disc having spaced recesses on its periphery for receiving the shank portion of a bolt blank, a circumferential guard for maintaining the bolt blanks within the recesses, a clamping member adapted to reciprocate radially of the disc and clamp the bolt firmly against said disc while the same is stationary, and means movable axially of the bolt for performing operations thereon when the bolt is clamped in position.

4. A machine of the class described comprising means for supplying predisposed bolt blanks, a rotatable disc having spaced recesses on its periphery for receiving the shank portion of the bolt blanks, circumferential guard for maintaining the bolt blanks within the recesses, a clamping member adapted to reciprocate radially of the disc and clamp the bolt firmly against said disc while the same is stationary, axially movable means for performing operations on the bolt so clamped, and means for disengaging the bolt from the disc.

5. A machine of the class described comprising means for supplying predisposed bolt blanks, an intermittently rotatable disc having spaced recesses on its periphery for receiving individually the shank portions of the predisposed bolt blanks from the supplying means said disc being disposed to receive a bolt within each recess, means for maintaining the bolt in position within the recesses, means for clamping the bolt firmly including a resiliently actuated reciprocatory jaw for engaging the bolt below the head thereof and holding it securely against the disc while said disc is stationary, a rotary tool adapted for longitudinal movement to engage and operate on the bolt so held, and a guard co-operative with the rotatable disc for freeing the bolt blank of the disc after the bolt is released.

6. A machine of the class described comprising supplying means including an inclined support adapted to feed vertically disposed bolts, an intermittently rotatable disc having a notched periphery and disposed adjacent the supplying means to receive a bolt in each notch from said supplying means, a guard adjacent the circumference of the disc disposed to maintain each supplied bolt within its notch, a clamping jaw disposed radially of the disc and actuated in synchronized relation with the disc to engage the bolt whereby said bolt is clamped securely while the disc is stationary, rotatable means arranged for movement axially of the bolt and adapted to operate on the bolt while so clamped, and a guard member engageable with the bolt subsequent to the bolt clamping jaw and adapted to disengage the bolt of the disc.

7. A machine of the class described comprising supplying means including an inclined support adapted to feed vertically disposed bolts, an intermittently rotatable disc having a notched periphery and disposed adjacent the supplying means to receive a bolt in each notch from said supplying means, a guard adjacent the circumference of the disc disposed to maintain each supplied bolt within its notch, a clamping jaw disposed radially of the disc and actuated in synchronized relation therewith to clamp the bolt securely while the disc is stationary, and means comprising a rotatable tool arranged for periodic reciprocation to engage and operate on the bolt while so clamped.

8. A machine of the class described comprising supplying means including an inclined support adapted to feed vertically disposed bolts, an intermittently rotatable disc having a notched periphery and disposed adjacent the supplying means to receive a bolt in each notch from said supplying means, a guard adjacent the circumference of the disc disposed to maintain each supplied bolt within its notch, a clamping jaw disposed radially of the disc and actuated in synchronized relation with the disc to engage the bolt whereby said bolt is held securely while the disc is stationary, and a power driven reciprocatory pointing tool synchronized with the clamping jaw to point the end of the bolt.

9. A machine of the class described comprising supplying means including an inclined support adapted to feed vertically disposed bolts, an intermittently rotatable disc having a notched periphery and disposed adjacent the supplying means to receive a bolt in each notch from said supplying means, a guard adjacent the circumference of the disc disposed to maintain each supplied bolt within its notch, a clamping jaw adapted to secure the bolt firmly against the disc, a power driven reciprocatory pointing tool synchronized with the clamping jaw to point the end of the bolt and a slidably maintained power drill likewise operated in synchronized relation with the clamping jaw for drilling the head of the bolt, said drill being actuated into operative relation while said bolt is clamped.

10. In a machine of the class described, a slidable clamping jaw having a slot therein, and a reciprocating member having a portion angularly disposed with respect to its axis of reciprocation and passing through said slot, whereby movement of said member causes said jaw to slide.

11. In a machine of the class described, a slidable clamping jaw having a slot therein, and a reciprocating member having a portion angularly disposed with respect to its axis of reciprocation and passing through said slot, whereby movement of said member causes said jaw to slide, the angle between said angularly disposed portion and said jaw being such that the drive is irreversible.

12. In a machine of the class described, a slidable clamping jaw having a slot therein, a plunger having an inclined portion projecting through said slot whereby reciprocation of said plunger causes said jaw to move toward and from clamping position, a rotatable member, a rod reciprocated thereby, and a resilient connection between said rod and said plunger.

13. In a machine of the class described, a slidable clamping jaw having a slot therein, a plunger having an inclined portion projecting through said slot whereby reciprocation of said plunger slides said jaw toward and from clamping position, the angle of said inclined portion being such that said jaw is self locking in clamped position, a rotatable member, a rod reciprocated thereby, and a resilient connection between said rod and said plunger.

14. In a machine of the class described, a slidable clamping jaw, a rotatable shaft, and means actuated by said shaft for positively sliding said jaw to released position, and for sliding said jaw to clamped position through a resilient element arranged to normally transmit motion from said shaft to said jaw, but adapted, when the reactive force of said jaw reaches a pre-determined point, to permit continued rotation of said shaft without further movement of said jaw.

15. In a machine of the class described, a slidable clamping jaw, having a slot therein, a plunger having an inclined portion projecting through said slot and adapted to be reciprocated to move said jaw to clamped and released positions, and driving means arranged to positively move said plunger to jaw releasing position, and to move said plunger to jaw clamping position through a resilient connection.

In testimony whereof, I affix my signature.

WM. V. LOZIER.